US009185090B1

(12) United States Patent
Zubovsky

(10) Patent No.: US 9,185,090 B1
(45) Date of Patent: Nov. 10, 2015

(54) METHOD AND APPARATUS FOR SIMPLIFIED, POLICY-DRIVEN AUTHORIZATIONS

(75) Inventor: Valery Zubovsky, San Francisco, CA (US)

(73) Assignee: Charles Schwab & Co., Inc, San Francisco, CA (US)

( * ) Notice: Subject to any disclaimer, the term of this patent is extended or adjusted under 35 U.S.C. 154(b) by 982 days.

(21) Appl. No.: 12/283,362

(22) Filed: Sep. 10, 2008

(51) Int. Cl.
*G06F 17/00* (2006.01)
*G06F 7/04* (2006.01)
*H04L 29/06* (2006.01)

(52) U.S. Cl.
CPC ............. *H04L 63/08* (2013.01); *H04L 29/06* (2013.01); *H04L 63/10* (2013.01); *H04L 63/20* (2013.01)

(58) Field of Classification Search
CPC ......... H04L 63/08; H04L 63/10; H04L 63/20; H04L 41/0893
See application file for complete search history.

(56) References Cited

U.S. PATENT DOCUMENTS

| | | | |
|---|---|---|---|
| 7,592,906 B1* | 9/2009 | Hanna et al. | 340/506 |
| 2005/0102530 A1* | 5/2005 | Burrows | 713/200 |
| 2006/0047832 A1* | 3/2006 | Betts et al. | 709/229 |
| 2007/0056019 A1* | 3/2007 | Allen et al. | 726/1 |
| 2007/0174031 A1* | 7/2007 | Levenshteyn et al. | 703/13 |
| 2008/0263644 A1* | 10/2008 | Grinstein | 726/6 |
| 2009/0037736 A1* | 2/2009 | Djordjrvic et al. | 713/170 |
| 2009/0288136 A1* | 11/2009 | Chang et al. | 726/1 |
| 2010/0042973 A1* | 2/2010 | Anderson et al. | 717/120 |

* cited by examiner

*Primary Examiner* — Krista Zele
*Assistant Examiner* — Matthew Lindsey
(74) *Attorney, Agent, or Firm* — Innovation Partners; Charles E. Gotlieb

(57) ABSTRACT

A system and method uses a set of XACML policies to identify an action or other single degree of variations of various entities that may be called using requests, and uses information from the policy that is useful for obtaining one or more XACML subjects and resources from a request to access the resource, and then builds an XACML policy request using the action or other single degree of variation, and the one or more subjects and resources to determine if authorization for performing the action or other single degree of variation on the one or more resources on behalf of the one or more subjects is granted. Only if the authorization is granted is the action or other single degree of variation performed on the one or more resources.

21 Claims, 3 Drawing Sheets

METHOD AND APPARATUS FOR SIMPLIFIED, POLICY-DRIVEN AUTHORIZATIONS

FIELD OF THE INVENTION

The present invention is related to computer software and more specifically to computer software for security.

BACKGROUND OF THE INVENTION

XACML is an authorization standard that allows a device to submit a context request to a device that determines if access to should be granted. Conventional XACML arrangements can end up being difficult to manage and slow.

SUMMARY OF INVENTION

A single degree of variation is identified for all of the identifiable entities, such as service operations, that may require authorization to any of one or more resources. Such entities will correspond to requests in one embodiment. The single degree of variation may be the action that each of the entities may be performing. A service operation performs a function, and may be part of a computer program provided as a web service that performs multiple functions via different service operations.

One policy document is identified for each combination of A) a single degree of variation and B) a set of one or more resources, that may apply to any entity. A policy document contains one or more policies, similar to a conventional XACML policy set. If the policy document contains more than one policy, each policy document contains policies that all correspond to a common single degree of variation, but each may correspond to different resources. A list that correlates each entity to a policy document is received. The list is determined using the single degree of variation that applies to the entity. The actual one or more policies that will be used in the policy document will depend on the single degree of variation that applies to the entity and the set of one or more resources to which the entity requires access.

When a request is received for an entity, the request specifies the entity corresponding to the request, and may specify resources and subjects that can be used to authorize the request. The policy document that corresponds to the entity specified in the request is identified using the correlation. The action or other single degree of variation is identified from the policy. The policy document specifies a name, namespace and location of the one or more resources and subjects in any request that uses the policy, and using the name, namespace and location of the resources and subjects in the policy document, and the request, the one or more resources and one or more subjects are extracted from the request.

A conventional XACML context request is built using the action or other single degree of variation identified, and the one or more subjects and one or more resources extracted from the request, and the context request is used to apply the policies from the policy document to the action or other single degree of variation, subjects and resources to determine if the action or other single degree of variation to be performed on the one or more resources should be granted based on the subjects. If, according to the policy document, such access should be granted, access to the one or more resources is granted, and otherwise, it is denied.

Such policy documents can be simpler and easier to manage and use than some conventional XACML policy sets and the building of XACML context requests is simplified, as different logic is not required for each web service request or groups of related web service requests.

DETAILED DESCRIPTION OF A PREFERRED EMBODIMENT

Figure 1:
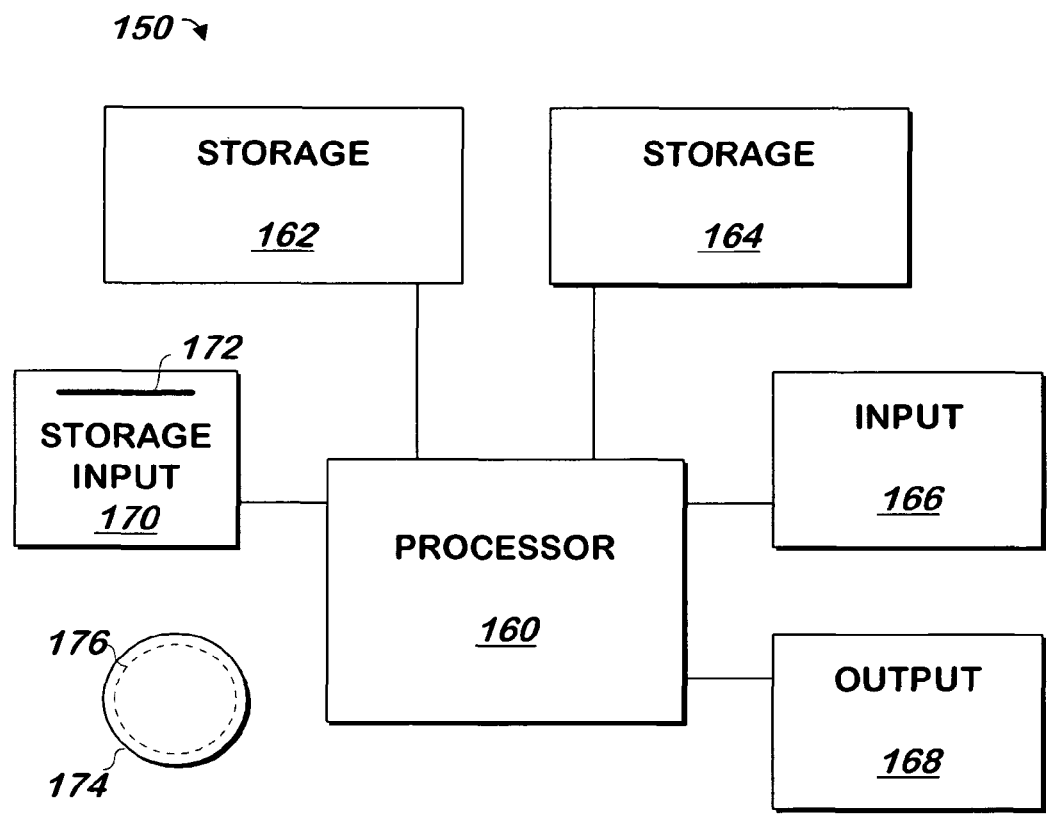
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Tex. running a version of the WINDOWS operating system (such as 95, 98, Me, XP, NT or 2000) commercially available from MICROSOFT Corporation of Redmond Wash. or a Macintosh computer system running the MACOS or OPENSTEP operating system commercially available from APPLE INCORPORATED of Cupertino, Calif. and the FIREFOX browser commercially available from MOZILLA FOUNDATION of Mountain View, Calif. or INTERNET EXPLORER browser commercially available from MICROSOFT above, although other systems may be used.

Figure 2:
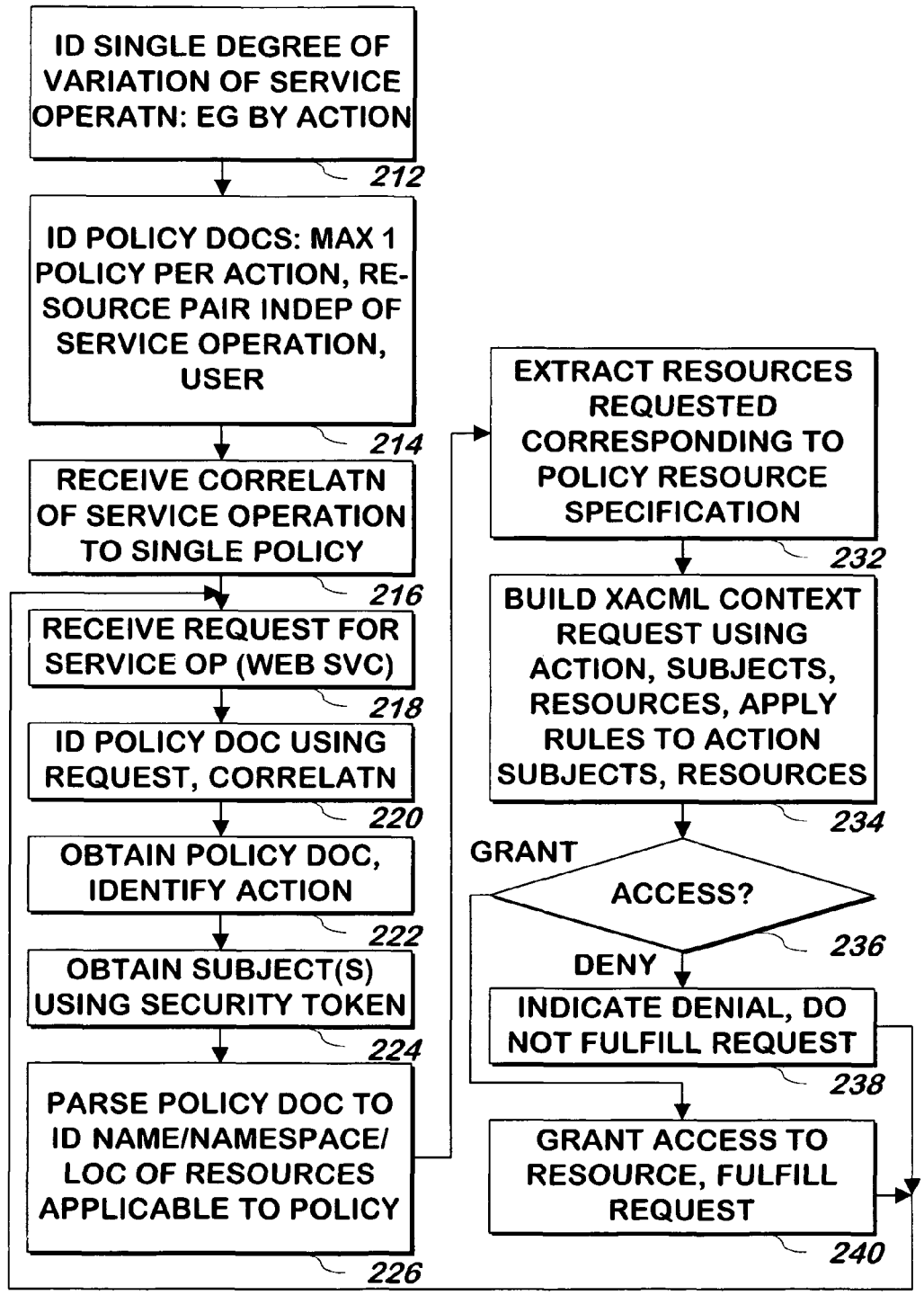
FIG. 2 is a flowchart illustrating a method of receiving policy information and granting or denying requests according to the policy information according to one embodiment of the present invention.

Referring now to FIG. 2, a method of identifying policies and granting or denying access to one or more resources is shown according to one embodiment of the present invention. A single degree of variation is identified 212 for all of the identifiable entities that may require access to any of the one or more resources. In one embodiment, each entity is a service operation that performs a function as part of, or all of, a conventional web service. A single degree of variation may be an action that the service operation performs. If some service operations perform a "view" function, and other service operations perform a "change" function, the single degree of variation is an action.

In one embodiment, a "single degree of variation" is an operational way that one entity that will require access to one or more resources varies from at least some other entities, other than resources and subjects. For example, it may be the action that each entity called by a request that will need access to one or more resources will perform. If some entities may perform the same action, but at least one entity will perform an action different from at least one other entity, the single degree of variation may be the action the entity performs.

Policy documents containing one or more policies are optionally identified 212 using the single degree of variation identified, and other information, described herein. In one embodiment, policy documents are containers for one or more policies.

Each policy document contains policies corresponding to a common single degree of variation and one set of one or more resources. Using the example above, in the embodiment where the single degree of variation are actions, one or more policy documents may be identified for "view" actions, and another one or more policy documents may be identified for "change" actions.

In one embodiment, one policy document is identified for each combination of A) a single degree of variation, and B) a set of one or more resources. In the embodiment in which the single degree of variation is an action, one policy document is identified for each action that can be performed on each set of one or more resources. In one embodiment, if a different action is to be performed on the same set of one or more resources, a different policy document is used. If the same action is to be performed on different sets of one or more resources, a different policy document may be used. Thus, a single policy may apply only to an action performed on the identical set of resources. If a policy document is identified that applies to an action for resources A and B, a different policy document could be identified to apply to the same action performed on resource A alone, or resources A, B and C.

In one embodiment, the policy documents are identified independently of the entity, such as a service operation, that will be accessing resources, and/or independently of the user (e.g. a name of a user) or user groups (which may be referred to as "roles", e.g. "salespeople") on whose behalf the action will be performed.

A list that correlates each entity to a policy document is received 216. If the entities are service operations, the name used to call the service operation may be specified in the list. The policy document corresponding to the single degree of variation and set of one or more resources that the entity uses is also included in the list. Thus, a service operation that performs a view action on a set of one or more resources will correspond to a policy document, and this policy document is correlated to the name of the service operation on the list.

A request is received that describes an entity 218 that will access one or more resources. As noted, the entity may be one of many different service operations, which may be provided as web services. There may be different service operations for each of several actions and sets of one or more resources. In one embodiment, the request specifies the entity, such as the service operation, that corresponds to the request, and may specify resources and subjects that can be used to authorize the request. In one embodiment, the request is formatted in a conventional web services format, such as XML. The resources may be specified in various locations of the request. The subjects of the request are specified by a security token, which is part of the header of the request that is contained in the envelope of the request.

The policy that corresponds to the entity specified in the request is identified 220 using the correlation, or list received in step 216. The action is identified 222 using the policy identified in step 220. It is noted that the action may also be identified from the correlation or elsewhere. In such embodiment, the information from the correlation or elsewhere may be considered part of the policy.

The subject or subjects of the request are identified 224 from the security token of the header of the envelope of the request.

In one embodiment, each policy specifies a location, namespace and name of the one or more resources to which it applies, and so the locations, namespaces and names of the resources are identified 226 from the policy document identified in step 220. If the policy document contains multiple policies, the locations, namespaces and names from all of the resources from all of the policies of the policy document are identified any duplicates removed as part of step 226. In one embodiment, any location, name and namespace specified in the policy may be a resource. In another embodiment, a list of possible locations, names and namespaces of resources may be used to identify any locations, names and namespaces in the policy document that match those on the list. In still another embodiment, the context of the location, name and namespace in the policy document may be used to determine if it corresponds to a resource.

Then, using the locations, names and namespaces, any of the one or more resources that correspond to those locations, names and namespaces are extracted 232 from the request. In one embodiment, the request contains a body, with a request section, and so the information is extracted from the request section. Thus, if there are multiple requests for different entities that use the same policy, each request will use a format for the subjects and resources to allow them to be located using the policy.

In one embodiment, any resources specified in the request that correspond to the policy document are extracted in this fashion. If they can be located in the request, they are so located.

In one embodiment, other information useful for locating the one or more subjects and resources may be used to locate such information in the request, and such information need not be physically located as a part of the policy, but may instead be part of the correlation. When such information is included in the correlation, it is considered to be part of the "policy" as used herein, in spite of the fact that it is located elsewhere and not used as part of the context request authorization, described below. An advantage of using only the policy to identify the resources to extract from the request is that a separate document does not need to be synchronized with the policy to allow the extraction to properly take place, A conventional XACML context request is built using the action identified, and the one or more subjects and one or more resources extracted, and the context request is used to apply the policies from the policy document to the action or other single degree of variation, subjects and resources to determine if the action to be performed or other single degree of variation on the one or more resources should be granted based on the subjects 234.

As part of step 234, the policy document is used in the manner of a conventional XACML policy or policy set so that conventional XACML policy application methods may be used. However, step 234 may be implemented using specifications other than XACML. In one embodiment, the context request will specify the policy document to be used, and in another embodiment, the context request merely specifies the action, subject or subjects and set of one or more resources.

If, according to the policy, action, subjects and resources, such access should be granted 236, access to the one or more resources is granted, the request is fulfilled 240, and the method continues at step 220, and otherwise, access is denied, the request is not fulfilled 238, and the method continues at step 220.

In one embodiment, resource locations, names and namespaces are specified and extracted consistent with the XPath (XML Path Language) version 1.0 or 2.0 standards described at the web site of "w3.org/TR/xpath", or "w3.org/TR/xpath20".

System.

Figure 3:
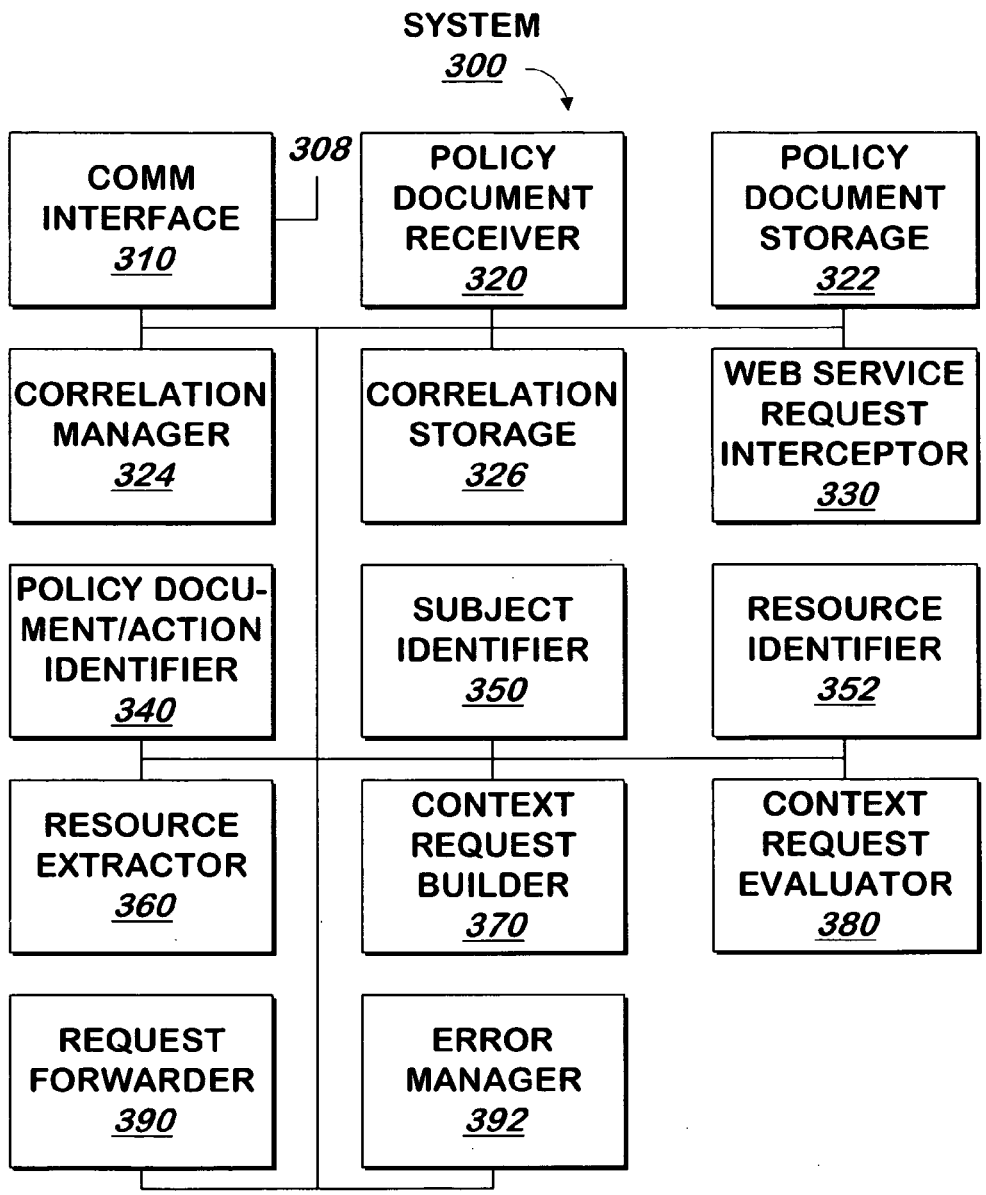
FIG. 3 is a block schematic diagram of a system for receiving policy information and granting or denying requests according to the policy information according to one embodiment of the present invention.

FIG. 3 illustrates a system 300 for approving and denying requests for web services according to one embodiment of the present invention. Referring now to FIG. 3, communication 310 includes a conventional communication interface, such as a conventional Ethernet interface running TCP/IP, Ethernet and other conventional communications protocols. In one embodiment, all communication into or out of system 300 is made via input/output 308 of communication interface 310.

Receipt and Storage of Policy Documents and Correlation.

Policy document receiver 320 receives from a system administrator, policy documents as described herein, and stores them in policy document storage 322, which may include conventional memory and disk storage, and may optionally include a conventional database. The policy documents are organized and have the contents as described herein.

Correlation manager 324 receives from a system administrator, the correlation described herein, and stores it into correlation storage 326, which includes conventional memory or disk storage, and optionally a conventional database.

Receipt of Web Services Request and Identification of Policy Document.

When web service requests as described herein are received or intercepted by communication interface 310, it sends them to web services request interceptor 330. Web services request interceptor 330 receives the web services requests. Web services request interceptor 330 parses the web services request to identify the component parts described herein and passes to policy document identifier 340 the name of the web service being requested and any other information from the request needed by policy document/action identifier 340.

When it receives such information, policy document/action identifier 340 identifies the policy document using the correlation between the name and the policy document described in the correlation in correlation storage 326. Policy document/action identifier 340 retrieves the action from the policy document, for example, by parsing the policy document and extracting the action from a certain portion of the policy document, or such action may be part of the correlation, and it is retrieved from the correlation. Policy document/action identifier 340 provides an identifier of, or handle to, the policy document and the action to web service request interceptor 330.

Identify Subject

Web service request interceptor 330 provides the security token from the request to subject identifier 350, which identifies the subject from the security token and provides it to web service request interceptor 330.

Identify Resources that May be Used.

When it receives the identifier of, or handle to, the policy document, web service request interceptor 330 provides it to resource identifier 352, which extracts the name, namespace and location of all resources applicable to the policy document corresponding to the identifier or handle it received, and provides a list of them to web service request interceptor 330. In one embodiment, any name, namespace and location contained in the policy document is identified as a resource applicable to the policy document, and in another embodiment, the context of the name, namespace and location is used to eliminate certain ones or to identify them. In one embodiment, specification and extraction of location, names and namespaces is performed consistent with an XPath standard described above.

Identify Resources Requested.

When it receives the list of locations, names and namespaces of the resources in the policy document, as described herein, to web service request interceptor 330 provides them and the portion of the request that may contain the resources as described above to resource extractor 360, which extracts any resources from the portion of the request it receives as described above and provides them to web services request interceptor 330.

Build Context Request.

When web service request interceptor has received the identifier of or handle to the policy document and the action, the subject from subject identifier 350 and the resources from resource extractor 360, web service request interceptor 330 provides some or all such information to context request builder 370. In one embodiment, the policy document handle or identifier is not provided to context request builder 370.

When it receives the information described herein, context request builder 370 uses it to build a conventional XACML context request describing the subject, action and resource or resources, and provides the context request, and optionally the identifier or handle of the policy document to context request evaluator 380. In one embodiment, instead of specifying the action, the context request specifies the policy document corresponding to the request, identified as described herein.

Evaluating the Context Request.

Context request evaluator 380 evaluates the context request using conventional XACML context request evaluation techniques. In one embodiment, context request evaluator 380 evaluates the context request using all of the policy documents stored in policy document storage (by itself applying the policies in the policy document corresponding to the action) or by using the policy document specified.

Context request evaluator 380 evaluates the context request by indicating that the context request is approved or denied. In one embodiment, context request evaluator 380 may also indicate that it does not have sufficient information, but in such embodiment, that response is treated as if the request is denied.

Context request evaluator 380 provides the indicator at its output, providing an indicator of an approval to request forwarder 390, or providing an indicator of a denial to error manager 392.

When it receives the indication that the request was approved, request forwarder 390 obtains the request from web service request interceptor 330 and forwards it to its intended destination via communication interface 310. In one embodiment, request forwarder uses a table of destinations it stores (having been received by a system administrator) that maps the name of the request to the destination. Such table may be part of the correlation in correlation storage 326.

When error manager 392 receives the indication that the request is denied, it requests and receives the request from web service request interceptor 330 and, using the source IP address and port of the request to identify its sender, indicates that an error has occurred to the sender of the request.

What is claimed is:

1. A method of authorizing a request in a plurality of requests, comprising:
   receiving a plurality of XACML policies, each of at least some of the plurality of XACML policies corresponding to a different pair of a single degree of variation of a plurality of entities that may correspond to the plurality of requests and a set of at least one resource, each of the plurality of XACML policies specifying at least a location of at least one of a group comprising at least one resource and at least one subject;
   receiving a correlation of each of a plurality of requests to at least one of the plurality of XACML policies;
   receiving the request comprising at least one of a group comprising at least one resource and at least one subject;
   identifying at least one of the plurality of XACML policies correlated to the request;
   retrieving an action and information useful for locating at least one resource from the at least one of the plurality of XACML policies identified;
   extracting from the request received at least one identifier of at least one subject;
   extracting from the request received at least one identifier of at least one resource using the information retrieved;
   building an XACML context request responsive to the action retrieved, and the at least one identifier of the at least one subject and the at least one identifier of the resource extracted;
   submitting the XACML context request built to obtain an authorization decision to perform the action on the at least one resource;
   obtaining the authorization decision; and
   performing the action on the at least one resource responsive to the authorization decision obtained.

2. The method of claim 1, wherein the single degree of variation comprises actions.

3. The method of claim 2, wherein the actions comprise viewing and changing.

4. The method of claim 1, wherein the plurality of XACML policies are received in a plurality of sets of at least one XACML policy, each XACML policy in each of the plurality of sets corresponding to the same single degree of variation, and, in at least one of the plurality of sets, at least one of the XACML policy in said set corresponding to at least one resource different from another XACML policy in said set.

5. The method of claim 1, wherein the request comprises a request for at least a part of a web service.

6. The method of claim 5, wherein the at least the part of the web service comprises an operation of the web service.

7. The method of claim 1, wherein the at least one of the plurality of XACML policies comprises a single logical XACML policy.

8. A system for authorizing a request in a plurality of requests, comprising:
   a policy document receiver, the policy document receiver having an input for receiving a plurality of XACML policies, at least some of the plurality of XACML policies corresponding to a different pair of a single degree of variation of a plurality of entities that may correspond to the plurality of requests and a set of at least one resource, each of the plurality of XACML policies specifying at least a location of at least one of a group comprising at least one resource and at least one subject, the policy document receiver for providing the received plurality of XACML policies at an output coupled to an electronic storage device;
   a correlation manager having an input for receiving a correlation of each of a plurality of requests to at least one of the plurality of XACML policies, the correlation manager for providing the received correlation at an output;
   a web service request interceptor having an input for receiving a request comprising at least one of a group comprising at least one resource and at least one subject, the web service request interceptor for providing at least some of the request at an output;
   a policy document/action identifier having an input coupled to at least two of a group comprising the web service request interceptor output for receiving at least some of the request, the correlation manager output for receiving the correlation, and the policy document receiver output for receiving at least one of the plurality of XACML policies, the policy document/action identifier for providing at an output at least one identifier of at least one of the plurality of XACML policies correlated to the request and an action corresponding to the at least one of the plurality of XACML policies;
   a resource identifier having an input coupled to the policy document receiver output for receiving at least one of the plurality of XACML policies and to the policy document/action identifier for receiving the at least one identifier of the at least one of the plurality of XACML policies, the resource identifier for retrieving and providing at an output information useful for locating at least one resource from the at least one of the plurality of XACML policies identified by said at least one identifier;
   a subject identifier having an input coupled to the web service request interceptor output for receiving at least some of the request, the subject identifier for extracting from the at least some of the request received at the subject identifier input at least one identifier of at least one subject;
   a resource extractor having an input coupled to the resource identifier output for receiving the information, and to the web service request interceptor for receiving at least some of the request, the resource extractor for extracting from the at least some of the request received at the resource extractor input and providing at an output at least one identifier of at least one resource using the information received at the resource extractor input;
   a context request builder having an input coupled to the resource extractor output for receiving the at least one identifier of the at least one resource, to the subject identifier output for receiving the at least one identifier of at least one subject, and to the policy document/action identifier output for receiving the action, the context request builder for building and submitting, built to obtain an authorization decision to perform the action on the resource, at an output an XACML context request responsive to the action, the at least one identifier of the at least one subject and the at least one identifier of the at least one resource received at the context request builder input; and a request forwarder having an input coupled to receive the authorization decision of the context request and coupled to the web service request interceptor output for receiving the at least some of the request, the request forwarder for providing at an output, to at least initiate a fulfillment of the request, at least some of the request received at the request forwarder input responsive to the authorization decision indicating the context request is authorized.

9. The system of claim 8, wherein the single degree of variation comprises actions.

10. The system of claim 9, wherein the actions comprise viewing and changing.

11. The system of claim 8, wherein the plurality of XACML policies are received in a plurality of sets of at least one XACML policy, each XACML policy in each of the plurality of sets corresponding to the same single degree of variation, and, in at least one of the plurality of sets, at least one of the XACML policy in said set corresponding tout least one resource different from another XACML policy in said set.

12. The system of claim 8, wherein the request comprises a request for at least a part of a web service.

13. The system of claim 12, wherein the at least the part of the web service comprises an operation of the web service.

14. The system of claim 8, wherein the at least one of the plurality of XACML policies comprises a single logical XACML policy.

15. A computer program product comprising a non-transitory computer useable medium having computer readable program code embodied therein for of authorizing a request in a plurality of requests, the computer program product comprising computer readable program code devices configured to cause a computer system to:
receive a plurality of XACML policies, at least some of plurality of XACML policies corresponding to a different pair of a single degree of variation of a plurality of entities that may correspond to the plurality of requests and a set of at least one resource, each of the plurality of XACML policies specifying at least a location of at least one of a group comprising at least one resource and at least one subject;
receive a correlation of each of a plurality of requests to at least one of the plurality of XACML policies;
receive the request comprising at least one of a group comprising at least one resource and at least one subject;
identify at least one of the plurality of XACML policies correlated to the request;
retrieve an action and information useful for locating at least one resource from the at least one of the plurality of XACML policies identified;
extract from the request received at least one identifier of at least one subject;
extract from the request received at least one identifier of at least one resource using the information retrieved;
build an XACML context request responsive to the action retrieved, and the at least one identifier of the at least one subject and the at least one identifier of the resource extracted;
submit the XACML context request built to obtain an authorization decision to perform the action on the at least one resource;
obtain the authorization decision; and
perform the action on the at least one resource responsive to the authorization decision obtained.

16. The computer program product of claim 15, wherein the single degree of variation comprises actions.

17. The computer program product of claim 16, wherein the actions comprise viewing and changing.

18. The computer program product of claim 15, wherein the plurality of XACML policies are received in a plurality of sets of at least one XACML policy, each XACML policy in each of the plurality of sets corresponding to the same single degree of variation, and, in at least one of the plurality of sets, at least one of the XACML policy in said set corresponding to at least one resource different from another XACML policy in said set.

19. The computer program product of claim 15, wherein the request comprises a request for at least a part of a web service.

20. The computer program product of claim 19, wherein the at least the part of the web service comprises an operation of the web service.

21. The computer program product of claim 15, wherein the at least one of the plurality of XACML policies comprises a single logical XACML policy.

* * * * *